United States Patent
Ribadeau-Dumas et al.

(10) Patent No.: US 6,743,456 B1
(45) Date of Patent: Jun. 1, 2004

(54) SWEETENING COMPOSITION AND ITS USES

(75) Inventors: Guillaume Ribadeau-Dumas, Verlinghem (FR); Catherine Fouache, Sailly la Bourse (FR); Pierrick Duflot, Lacouture (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 09/305,178

(22) Filed: May 4, 1999

(30) Foreign Application Priority Data

May 7, 1998 (FR) .............................. 98 05806

(51) Int. Cl.⁷ .............................. A23L 1/09; C13F 3/00
(52) U.S. Cl. ..................... 426/548; 127/30; 426/658
(58) Field of Search .................. 426/548, 658, 426/660, 3, 103, 534; 127/30, 27, 32, 58

(56) References Cited

U.S. PATENT DOCUMENTS

| | | | |
|---|---|---|---|
| 3,476,571 A | | 11/1969 | Block et al. ............ 99/130 |
| 3,915,736 A | * | 10/1975 | Oyamada et al. ............ 127/29 |
| 4,233,439 A | * | 11/1980 | Schiweck et al. ............ 536/4 |
| 4,457,921 A | | 7/1984 | Stroz et al. ............ 424/180 |
| 4,508,713 A | | 4/1985 | Stroz et al. ............ 514/60 |
| 5,236,719 A | * | 8/1993 | Meyers et al. ............ 426/3 |
| 5,314,701 A | * | 5/1994 | Mentink et al. ............ 426/103 |
| 5,458,892 A | * | 10/1995 | Yatka et al. ............ 426/5 |
| 5,470,591 A | * | 11/1995 | Ribadeau-Dumas et al. ... 426/3 |
| 5,795,397 A | * | 8/1998 | Shi et al. ............ 127/29 |

FOREIGN PATENT DOCUMENTS

| | | | |
|---|---|---|---|
| WO | WO 93 05663 | | 4/1993 |
| WO | 93/05663 | * | 4/1993 |
| WO | WO 97 01962 | | 1/1997 |

OTHER PUBLICATIONS de Man, J. Prinicples of Food Chemistry 2nd Ed., p. 251–253, 1990.*
Morrison, R. and R. Boyd, Principles of Organic Chemistry, 6th Ed., p. 324, 1992.*
M. Le Mestre et al., I.A.A., Jan.–Feb./,1990, p 5–12.
G.A. Hammond et al., Leatherhead Food R–A. report n° 652, p 11, Jun. 1989.

* cited by examiner

Primary Examiner—Arthur L. Corbin
(74) Attorney, Agent, or Firm—Sturm & Fix LLP

(57) ABSTRACT

The invention relates to a sweetening composition comprising a) at least one low soluble compound with a solubility in water of less than 60 g per 100 g of solution at 20° C. and b) at least one anti-crystallizing agent comprising a fraction of at least one compound selected from the group consisting of pyrodextrins and polyglucoses and a mixture of pyrodextrins and polyglucoses in the range of 1000 to 8000 Daltons. The invention relates also the use of such a composition for the manufacture of boiled sugars or as a flavoring carrier.

8 Claims, No Drawings

SWEETENING COMPOSITION AND ITS USES

FIELD OF THE INVENTION

The present invention relates to a new sweetening composition.

It also relates to the use of this sweetening composition for manufacturing boiled sugars, in particular plain boiled sugars, that is to say marketed without individual wrappings and as a flavour carrier.

BACKGROUND OF THE INVENTION

Boiled sugars, also commonly called hard sweets, are solid and substantially amorphous confectionery products. They are obtained by the forced dehydration of carbohydrate syrups. Generally, the process involves boiling mixtures of powdered sucrose and concentrated syrups of starch hydrolysates in a ratio varying in the range approximately 40/60 to approximately 65/35 in commercial weight. These mixtures usually contain enough water to dissolve all the sucrose crystals. These mixtures are then boiled at 130° C.–150° C. at ambient pressure in order to evaporate most of the water, then the boiling process is finished under vaccum in order to lower the water content still further and to bring it to a value of generally less than 3%. The plastic material obtained in this way is then cooled to a temperature in the range 125° C. to 140° C., if it is to be cast into moulds, or to a temperature in the range 90° C. to 115° C. if the next stage is shaping on rollers or extrusion. At this stage, various substances may be added such as flavourings, colorants, acids, plant extracts, vitamins or pharmaceutically active ingredients. After shaping or casting the boiled material and after returning to ambient temperature, boiled sugars are obtained which have a texture and appearance similar to that of glass.

The basic market for boiled sugars is currently still made up of products described as "of sugar" prepared from non-hydrogenated carbohydrate syrups. Substantially amorphous boiled sugars described as "without sugar" or based on polyols are also available, these being obtained in exactly the same way as described above, but using hydrogenated carbohydrate syrups and boiling to a much higher temperature in order to dehydrate the heated material even more. These carbohydrate syrups are generally syrups of maltitol or hydrogenated isomaltulose in solution.

It is expected that boiled sugars are stable over the course of time, that is to say that they change as little as possible from the time they are manufactured until the time they are consumed, while remaining attractive products and pleasant to consume.

Unfortunately, boiled sugars are not stable products from a thermodynamic point of view. The extent to which they change depends basically on their compositions after manufacture, but also on the conditions under which they are stored.

In the first place, boiled sugars can become sticky during storage. If they are wrapped, it becomes difficult, if not impossible, to remove the wrapping paper before eating them. They can also stick together in large clumps, which is even more annoying.

This problematic change towards a sticky and syrupy state is explained by surface effects and/or by internal effects.

Surface effects are due to the hygroscopic nature of boiled sugars. In fact it is known that boiled sugars, which are virtually anhydrous by essence, have equilibrium relative humidities which are always very low and are well below the usual ambient relative humidities during storage. This explains why water is inevitably taken up at the surface of the sweets when they are exposed and remain exposed to the air, as is the case, for example, with lollipops. When the amount of water absorbed is large enough, it tends to liquefy the surface of the sweets and to give them the characteristics of a syrup, that is to say in particular to give them a sticky character. This change seems to take place more rapidly when the boiled sugars have a low water content.

Internal effects, which thus involve not only the surface but the entire bulk of the sweet, have a thermal origin. More precisely, it is acknowledged that, if these events are to take place, the storage temperature has to be a little higher than the glass transition temperature of the boiled sugar. The concept which is referred to here is largely described in the excellent article "La transition vitreuse: incidences en technologie alimentaire" by M. Le Mestre and D. Simatos, published in I.A.A. of January/February, 1990. The glass transition temperature is the temperature at which, on heating, a glassy and solid boiled sugar becomes an amorphous syrupy liquid. It is well known that a boiled sugar can be subject to deformation, or may even lose its shape entirely, if its storage temperature is high and its glass transition temperature is fairly low. The product which is initially dry to the touch becomes sticky. It should be noted that the more water there is in the sugar, the more it is subject to a risk of changes of this kind during storage.

To summarise, in order to avoid boiled sugars becoming sticky during storage, it appears that there is still a requirement that the water content be neither too low nor too high.

In the second place, boiled sugars may have a tendency to crystallise in an uncontrolled manner during storage and, because of this, to lose their very attractive glassy appearance, since they then resemble more malt-sugars which, as is well known, are very different from the confectionery products which are dealt with in the context of the present invention. This crystallisation may take place only on the surface of the sweet or else also in the core of the sweet.

Surface crystallisation inevitably requires the absorption of a significant amount of water and corresponds to a stage of change which is complementary to the one described above. It also requires a large enough concentration of crystallisable molecules, generally molecules of sucrose, in the liquefied peripheral layer. When these two conditions are combined, crystallisation then takes place starting at the surface of the sweet and working its way towards the centre. This phenomenon, if it is uncontrolled, is known under the name 'turning'. It makes the sweets totally opaque and white.

Crystallisation may also take place right in the core of the boiled sugar if this contains large quantities of water or if the storage temperature is too high. Under these conditions, the boiled sugar then exhibits extreme softness and can no longer be considered to be a true solid. Rather it is a liquid supersaturated with crystallisable molecules whose change into a crystalline state is inevitable and quasi-spontaneous. Specialists call this type of crystallisation 'graining'.

In fact, if boiled sugars are not to be unstable, and become sticky or turned or grained over the course of time, it is still necessary, on the one hand, to regulate their water content and, on the other hand, to regulate the concentration of crystallisable molecules, that is usually the concentration of sucrose.

Immediately after manufacture, the boiled sugars obtained are either individually wrapped before being placed in bags or are placed directly into bags or cardboard boxes without any individual wrappers. In the latter case, the boiled sugars are called plain, that is without individual wrappers.

Currently, there are four solutions for making boiled sugars which are sufficiently resistant to humidity and heat to be marketed in the plain form.

The first consists in making sweets based on a syrup of hydrogenated starch hydrolysates and isomalt. In order to be marketed without individual wrappers, the boiled sugars have to contain more than 80 wt. %, on a dry basis, of isomalt. These sweets have been described in particular in the Leatherhead Food R.A. report no. 652, page 11, June 1989 (authors: G. A. Hammond and J. B. Hudson). Although the combination of these two products enables the absorption of water by the sweets obtained to be limited, especially as a result of the weakly hygroscopic nature of isomalt, it has resulted in a large increase in the cost price of the sweets and a perceptible loss of sweetening power. In fact, isomalt is a very costly product and therefore not really suitable for use as filling agent in products which are manufactured in large quantities. Moreover, this carbohydrate contains 5% of water of crystallisation and thus requires high boiling temperatures in order to achieve sufficient dehydration of the syrup and thus produce a high quality boiled sugar. Finally, boiled sugars based on isomalt have a tendency to grain over the course of time.

The second solution consists in making sweets based on sorbitol. This polyol permits the production of boiled sugars which remain stable against humidity due to microcrystallisation of the polyol in the bulk of the material and at the surface. This microcrystallisation is not visible to the naked eye and the boiled sugar is translucent immediately after manufacture. However, it has a tendency to whiten at the surface over the course of time which reduces its attractiveness.

The third solution consists in frosting the boiled sugar. Frosting consists in applying a crystallisable syrup, generally sucrose, to the surface of the sugar. Crystallisation of sucrose on the surface of the boiled sugar thus forms a barrier to aqueous changes. However, frosting deprives the frosted boiled sugar of the criterion of translucence.

The fourth solution consists in making boiled sugars with a very high concentration of sucrose (greater than 70 wt. %, on a dry basis). However, the main defect in these sweets is that they whiten very rapidly at the surface. They then become opaque.

An alternative would be to provide a particular composition of carbohydrates which enables the production of a sugar-free boiled sugar which is stable against humidity and heat and does not have the tendency with time to become opaque and white at the surface or in the core. Thus, several compositions have been suggested. For example, the document WO-A-95/26645 describes a sweetening composition comprising essentially lactitol, polydextrose and an intense sweetener. When a composition of this type is used to manufacture sugar-free boiled sugars, these sugars are not stable without individual wrappers. This composition is therefore not suitable for manufacturing plain boiled sugars.

In document U.S. Pat. No. 5,236,719, a dextrin from which the low molecular weight compounds have been eliminated by chromatography, and sold under the tradename FIBERSOL G is used, in combination with xylitol, sorbitol or maltitol, for the manufacture of boiled sugars.

However, since the polyols associated with the dextrin are very soluble, they do not crystallise at the surface of the boiled sugar. On the contrary, when boiled sugars based on this composition come into contact with the atmosphere they have a tendency to take up water and to become sticky. As a result, the boiled sugars obtained from this type of composition have of necessity to be individually wrapped in order to restrict this absorption of water.

OBJECTS AND SUMMARY OF THE INVENTION

The object of the invention is to remedy the disadvantages encountered in the prior art and to suggest a new sweetening composition, in particular for boiled sugars or for use as a flavouring carrier, which corresponds much better than existing compositions to the expectations of confectioners and to various practical requirements, that is to say having a greatly improved stability during storage.

Following detailed research, the applicants recognised that this object could be achieved and that, contrary to expectations, it was possible to prepare a stable boiled sugar, in particular an unwrapped sugar, if it were prepared from an amorphous sweetening composition in accordance with the present invention.

The boiled sugar obtained in this way can be described as stable to the extent that, over the course of time and without individual wrappers, it has no tendency:

to become sticky, or to grain or turn by becoming opaque and white at the surface or in the core, or to become misshapen at normal summer temperatures in temperate climates.

The applicants have discovered, in a surprising and unexpected manner, that in order to obtain a stable boiled sugar it is appropriate to use, for its manufacture, a composition comprising a not very soluble compound chosen from sugars and polyols and at least one anti-crystallising agent for this compound.

The invention therefore provides a sweetening composition characterised in that it comprises:

a) at least one not very soluble compound with a solubility in water of less than 60 g per 100 g of solution at 20° C., chosen from the group consisting of sugars and polyols, individually or as a mixture thereof; and b) at least one anti-crystallising agent comprising a fraction of at least one oligosaccharide or polysaccharide chosen from the group consisting of starch hydrolysates with a molecular weight in the range 500 to 8000 Daltons and having a glass transition temperature (Tg) of less than 140° C., said Tg being measured at a water content of 0%, and pyrodextrins and polyglucoses with a molecular weight in the range 1000 to 8000 Daltons, individually or as a mixture thereof.

Without wishing to be restricted by a theory, the applicants consider, following lengthy research work, that the remarkable stability of the composition according to the invention can be explained as follows. The not very soluble compound according to the invention, that is to say the sugar or the polyol, crystallises rapidly at the surface of the boiled sugar, thus restricting the transfers of water from the atmosphere to the boiled sugar. As a result of this microcrystallised surface layer, the boiled sugar is thus stabilised against humidity. The anti-crystallising agent confers stability with regard to temperature and the criterion relating to translucence. Precisely selected on the basis of its molecular weight, it enables the glass transition temperature of the composition according to the present invention to be adjusted so that it is above ambient temperature, in particular to provide a glass transition temperature of greater than 30° C. for its effective water content. Given such a glass transition temperature, the boiled sugars obtained by using the composition according to the invention do not deform. By combining, in the composition according to the invention, a not very soluble compound and an anti-crystallising agent for this compound, it is therefore possible to prepare stable plain boiled sugars.

In the present invention, a fraction of at least one oligosaccharide or polysaccharide is understood to mean the selection of a compound of this type with a specific molecular weight or with a given range of molecular weights.

The oligosaccharide and/or polysaccharide can be chosen from among starch hydrolysates with a molecular weight in the range 500 to 8000 Daltons. In the context of the present invention, the expression starch hydrolysate relates to any product or any mixture of products resulting from the hydrolysis of a starch of any kind, by a chemical or enzymatic route, with the proviso that they satisfy the double condition of having a molecular weight in the range 500 to 8000 Daltons and a glass transition temperature (Tg) of less than or equal to 140° C., said Tg being measured at a water content of 0%, which excludes, for example, maltodextrins.

This fraction can also be selected from among pyrodextrins or polyglucoses with a molecular weight in the range 1000 to 8000 Daltons (which excludes, for example, polydextrose, a product marketed by the Pfizer company). The pyrodextrins or polyglucoses used in the invention, advantageously, have a molecular weight in the range 1000 to 6000, preferably in the range 2000 to 5000, in particular in the range 4000 to 5000 Daltons.

In the context of the present invention, the expression polyglucose relates to products containing a majority of 1–6 bonds, obtained from glucose by condensation or rearrangement under the combined effects of heat and acids in a medium almost without water, with the proviso that they satisfy the condition of having a molecular weight within the ranges mentioned above.

In the context of the present invention, pyrodextrins are understood to be products obtained by heating starch the moisture content of which has been reduced to a very low level, generally in the presence of acidic or basic catalysts, with the proviso that they satisfy the condition of having a molecular weight within the ranges mentioned above. This dry heating procedure for starch, most usually in the presence of an acid, leads to both a depolymerisation of the starch and to a rearrangement of the fragments of starch obtained, producing highly branched molecules.

The fractions of starch hydrolysates, pyrodextrins or polyglucoses may be used in the composition according to the invention either individually or as a mixture thereof.

Advantageously, the anti-crystallising agent is hydrogenated and/or oxidised. Excellent results have thus been obtained with, as the fraction of a hydrogenated starch, maltotriitol or with, as the fraction of a hydrogenated pyrodextrin, a dextrin with a molecular weight of about 4500 Daltons, combined with a not very soluble compound chosen from the group consisting of trehalose, lactose, mannose, maltose, erythritol, mannitol, glucopyranosido-1,6-mannitol and lactitol.

In accordance with one particular embodiment of the invention, the ratio by weight of anti-crystallising agent/not very soluble compound is in the range 10/90 to 90/10, preferably in the range 20/80 to 80/20.

Excellent results have thus been obtained using compositions according to the invention which contain:

25 wt. % to 35 wt. %, on a dry basis, of mannitol and 65 wt. % to 75 wt. %, on a dry basis, of a fraction of hydrogenated dextrins, 65 wt. % to 75 wt. %, on a dry basis, of lactitol and 25 wt. % to 35 wt. %, on a dry basis, of a fraction of hydrogenated dextrins, 40 wt. % to 80 wt. %, on a dry basis, of glucopyranosido-1,6-mannitol and 20 wt. % to 60 wt. %, on a dry basis, of maltotriitol.

MORE DETAILED DESCRIPTION

Other characteristics and advantages of the invention will emerge on reading the following examples, these relating to use of the composition according to the invention for the manufacture of boiled sugars. These examples are given to illustrate the invention and are non-limiting.

EXAMPLE 1

Effects of the Nature of the Not Very Soluble Compound

In this example, the anti-crystallising agent used is a hydrogenated dextrin with a molecular weight of 4500 Daltons. It is used in combination with various polyols, in accordance with the proportions given in table 1.

TABLE 1

| Test no. | Polyol | % of polyol | % of anti-crystallising agent |
| --- | --- | --- | --- |
| 1 | mannitol | 30 | 70 |
| 2 | lactitol | 70 | 30 |
| 3 | maltitol | 50 | 50 |
| 4 | isomalt (control) | 100 | 0 |

Tests 1 to 2 are in accordance with the present invention. Test 3 is a comparison test using a polyol which is not within the scope of the present invention. Test 4 is a control test using 100% of isomalt (eauimolecular mixture of glucosido-1,6-mannitol and isomaltitol, obtained by hydrogenation of isomaltulose resulting from an enzymatic conversion of sucrose).

Starting with the compositions listed in table 1, solutions of 75% of dry matter of the carbohydrates are made up by dissolution in the appropriate amount of water.

The syrups obtained are boiled over a naked flame to the chosen temperature, in the range 140° C. to 180° C.

The boiled sugars thus obtained are analysed for water content and glass transition temperature. Moreover, stability tests are performed by placing the boiled sugars, without individual wrappers, in a microclimate at 66% relative humidity and 20° C. for 10 days. At the end of this period, the boiled sugars are observed and their deformation, stickiness and state of crystallisation (graining) are recorded. The scoring system was as follows:

0: none

+: traces

++: important

+++: extremely important

The results of the stability tests obtained for the boiled sugars manufactured from the compositions described in table 1 are summarised in table 2 below.

TABLE 2

| Test no. | Boiling temp. (° C.) | Initial water (%) | Tg (° C.) | Deformation | Stickiness | Graining |
|---|---|---|---|---|---|---|
| 1 | 140 | 3.0 | 35.3 | 0 | 0 | ++ |
| 2 | 150 | 3.3 | 41.5 | 0 | 0 | ++ |
| 3 | 150 | 2.4 | 49.2 | + | ++ | 0/+ |
| 4 | 180 | 2.0 | 49.0 | 0 | 0 | +++ |

The boiled sugars prepared from the compositions according to the present invention, and in particular the one comprising 70% of hydrogenated dextrins and 30% of mannitol with a 3.0% residual water content and the one comprising 30% of hydrogenated dextrins and 70% of lactitol with a 3.3% residual water content, have a stability which is comparable to that of the boiled sugar prepared from 100% isomalt. The boiled sugars are never sticky and do not deform. They may therefore be marketed plain, without wrappings.

These same boiled sugars grain less rapidly than boiled sugars based on isomalt.

EXAMPLE 2

Effect of the Molecular Weight of the Anti-crystallising Agent

Several boiled sugars are prepared by boiling the following mixtures, each of which has an initial dry matter of about 75%.

- a first mixture, composed in the dry of 70% of lactitol and 30% of hydrogenated polydextrose with a molecular weight of 800 Daltons (product marketed by the Pfizer company),
- a second mixture, in accordance with the invention, composed in the dry of 70% of lactitol and 30% of a hydrogenated dextrin with a molecular weight of 4500 Daltons.

These two mixtures are boiled over a naked flame, at a temperature of 155° C., in such a way as to obtain boiled sugars containing 3.5% of residual water.

The boiled sugars obtained in this way are analysed for water content and glass transition temperature. Moreover, stability tests are performed by placing the boiled sugars without individual wrappers in a microclimate at 66% relative humidity and 20° C. for 10 days. At the end of this period, the boiled sugars are observed and their deformation, stickiness and state of crystallisation (graining) are recorded. The scoring system was as follows:

0: none
+: traces
++: important
+++: extremely important

The results of the stability tests obtained are summarised in table 3 below.

TABLE 3

|  | Water content | Tg (° C.) | Deformation | Stickiness | Graining |
|---|---|---|---|---|---|
| Mixture 1 | 3.6 | 49.4 | + | + | +++ |
| Mixture 2 | 3.0 | 45 | 0 | 0 | ++ |

The boiled sugars prepared from the second mixture in accordance with the invention are never sticky and do not deform. They may therefore be sold plain, unwrapped.

These same boiled sugars grain less rapidly than the boiled sugars based on lactitol and polydextrose.

EXAMPLE 3

Several boiled sugars are prepared by boiling the following mixtures, each of which has an initial dry matter of about 75%.

- a first mixture, in accordance with the invention, composed in the dry of 30% of maltotriitol and 70% of glucopyranosido-1,6-mannitol (GMP),
- a second mixture, in accordance with the invention, composed in the dry of 50% of maltotriitol and 50% of GMP,
- a third mixture (control), composed in the dry of 100% of isomalt.

These three mixtures are boiled over a naked flame, at a temperature of 180° C., in such a way as to obtain boiled sugars.

The boiled sugars obtained in this way are analysed for water content and glass transition temperature. Moreover, stability tests are performed by placing the boiled sugars without individual wrappers in a microclimate at 66% relative humidity and 20° C. for 10 days. At the end of this period, the boiled sugars are observed and their deformation, stickiness and state of crystallisation (graining) are recorded. The scoring system was as follows:

0: none
+: traces
++: important
+++: extremely important

The results of the stability tests obtained are summarised in table 4 below.

TABLE 4

|  | Water content | Tg (° C.) | Deformation | Stickiness | Graining |
|---|---|---|---|---|---|
| Mixture 1 | 2.1 | 53.8 | 0 | 0 | + |
| Mixture 2 | 2.3 | 52.9 | 0 | 0 | + |
| Mixture 3 | 2.0 | 49.0 | 0 | 0 | ++ |

The boiled sugars prepared from a composition in accordance with the invention containing 30% to 50% of maltotriitol on a dry basis and 70% to 50% of glucopyranosido-1,6-mannitol have an appearance similar to that of the boiled sugars based on isomalt: no stickiness and no deformation.

What is claimed is:

1. A stable, translucent and non-sticky boiled sugar composition comprising a) at least one soluble compound with a solubility in water of less than 60 g per 100 g of solution at 20° C. selected from the group consisting of trehalose, lactose, mannose, maltose, erythritol, mannitol, glucopyranosido-1,6-mannitol and lactitol and b) at least one anti-crystallizing agent comprising a fraction of at least one compound selected from the group consisting of pyrodextrins with a molecular weight in the range of 11000 to 8000 daltons wherein the ratio by weight of anti-crystallizing agent to the soluble compound is in the range of 10/90 to 90/10 whereby the boiled sugar presents a microcrystallized surface layer.

2. A boiled sugar composition according to claim 1, having a glass transition temperature above ambient temperature.

3. A boiled sugar composition according to claim 1, having a glass transition temperature of greater than 30° C. for its effective water content.

4. The boiled sugar composition according to claim 1, wherein the anti-crystallizing agent is hydrogenated or oxidized.

5. The boiled sugar composition according to claim 1, wherein the ratio by weight of anti-crystallizing agent to the soluble compound is in the range of 20/80 to 80/20.

6. A boiled sugar composition according to claim 1, comprising by weight on a dry basis 25% to 35% of mannitol and by weight on a dry basis 65% to 75% of a fraction of hydrogenated dextrins.

7. A boiled sugar composition according to claim 1, comprising by weight on a dry basis 65% to 75% of mannitol and by weight on a dry basis 25% to 35% of a fraction of hydrogenated dextrins.

8. A boiled sugar composition according to claim 1, wherein the pyrodextrins present a molecular weight in the range of 4000 to 5000 daltons.

* * * * *

UNITED STATES PATENT AND TRADEMARK OFFICE
CERTIFICATE OF CORRECTION

PATENT NO. : 6,743,456 B1
DATED : June 1, 2004
INVENTOR(S) : Guillaume Ribadeau-Dumas et al.

It is certified that error appears in the above-identified patent and that said Letters Patent is hereby corrected as shown below:

<u>Column 8,</u>
Line 61, should read -- the range of 1000 to 8000 daltons wherein the ratio by --

Signed and Sealed this

Sixteenth Day of November, 2004

JON W. DUDAS
*Director of the United States Patent and Trademark Office*